June 18, 1968 J. G. VINCENT, JR., ET AL 3,388,424
INSTRUMENTED EJECTION CAM
Filed April 1, 1966

INVENTORS.
JAMES G. VINCENT
PAUL E. WRAY
BY

ATTORNEY

United States Patent Office 3,388,424
Patented June 18, 1968

3,388,424
INSTRUMENTED EJECTION CAM
James G. Vincent, Jr., West Nyack, and Paul Eugene Wray, Monroe, N.Y., assignors to American Cyanamid Company, Stamford, Conn., a corporation of Maine
Filed Apr. 1, 1966, Ser. No. 539,553
4 Claims. (Cl. 18—2)

This invention relates to an improved rotary tabletting machine and more particularly to a tabletting machine in which the tablet ejection forces are accurately and continuously registered.

Rotary tabletting machines which are capable of high outputs present problems from time to time. Great variations in punch pressure are highly undesirable. They may be caused by bent or warped punches, changes in tabletting compositions or uniformity thereof, and the like. Unless these forces can be accurately and continuously monitored and measured, serious non-uniformity in punch pressures can arise without being conspicuously noticeable. This can result in a certain portion of poor tablets, for example tablets showing capping, and in the case of punches which bend or are otherwise deformed, can actually cause serious damage to the machine itself. Pressure anomalies do not normally occur instantaneously; generally there will be some warning, which makes it all the more important to monitor pressures more or less continuously or at least at frequent intervals.

It is standard procedure in experimental machines or machines for research purposes to provide one or more lower punches with compressive force measuring devices. This gives a practically perfect measurement of force exerted by the punch, but it is impractical for any production machine because, of course, the very large number of punches cannot economically be provided with strain gauges, to say nothing of the complication of transmission of the gauge signals through slip rings and the like. Even in research or special production machines where one or at most two or three lower punches have been instrumented, this gives information only with respect to those particular tablets, and a bent or warped punch in some other location does not show up.

In the development of the present invention it was at first thought that the ejection cam could be instrumented with strain gauges or load washers, for of course this is stationary and the various punches move over it, and it was thought that the records from the strain gauges could be synchronized with machine rotation so that the location of a particular punch could be determined. Attractive as the idea appeared at first, it proved to be completely useless because the cam tended to register a high initial force as a punch began to ride up its profile and also the readings were sometimes confused by the fact that more than one punch was in contact with the cam at the same time. As in all standard machines, the cam is a long inclined track considerably greater in dimension than that corresponding to a single punch.

Finally it was found, according to the present invention, that if one or more small segments of the ejection cam track were separately movable, preferably in the form of a cantilevered tongue fastened at one end and having the segment of the track at the other, all problems were solved. The force monitored by the ejection cam instrumentation produced a record graph of almost exactly the same shape as an individually instrumented lower punch, and it was thus for the first time practical to monitor continuously the forces on every lower punch as it crossed the segment of the ejection cam and, as has been pointed out above, it is a simple matter to synchronize the output of the strain gauges with rotation of the tabletting machine so that if the graph is anomalous, the particular punch which is at fault can be located.

For many machines a single movable segment is adequate, but in some cases, particularly where the punches are close together, it is preferable to have two movable segments side by side, as otherwise there is the risk that more than one punch may be in contact with the single segment at the same time. Each movable segment will have its own strain gauges or other sensors and will put out its own signal. The two signals can be separated by conventional electronic circuits, and since the two or more segments will constitute a larger portion of the total travel of the punches up the ejection track, the shape of a more extensive portion of the signal curve can be displayed and monitored. Where there is sufficient spacing of punches or where only part of a signal curve is needed, the single segment modification is quite adequate and of course presents the advantages of greater simplicity and somewhat lower cost. It is an advantage of the invention that the best modification can be chosen for a particular tabletting machine, using either a single movable segment or more than one.

The basic advantage of the present invention can be achieved even without the elaborate synchronization and is included in the broader aspects of the present invention. However, when means are provided for identifying particular punches, the device is even more useful and, therefore, constitutes a preferred embodiment of the invention.

It should be realized that the movements of the segment of the ejection cam track which is instrumented are extremely minute, and therefore there is no sudden jar or other undesirable periodic force which can adversely affect the punches as they pass up the ejection cam track. It is also an advantage of the invention that the new instrumented cam tracks fit into the standard tabletting machine without the necessity for any redesign or reconstruction. This is an added practical advantage. As the location and mounting of the new instrumented ejection cam track does not change the operation of the ordinary rotary tabletting machine in the slightest, the specific description of the invention which will follow does not show the other parts of the tabletting machine, which are conventional and standard and which would only confuse the drawing.

Reference has been made to the preferred form of the invention in which the movable segment of the ejection cam track is at the end of the cantilevered tongue, with strain gauges applied at a suitable point. This is by far the most practical and convenient form, but any other form in which the minute motions of the separate segment of the ejection cam track are measured will give signals which are, in general, the same as those obtained in the preferred embodiment. Therefore, in its broadest aspects the invention is not limited to this exact preferred constructional design.

The invention will be described in greater detail in conjunction with the drawings, in which.

Figure 1:
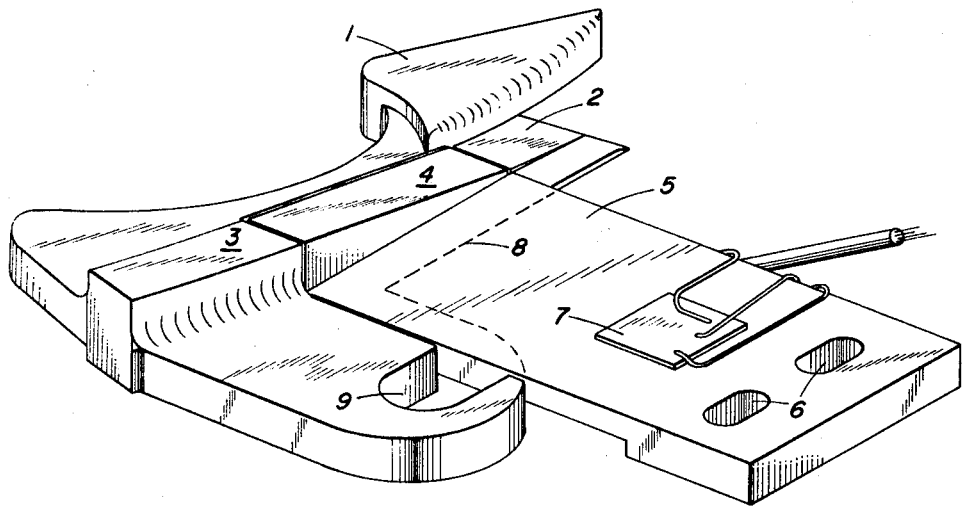
FIG. 1 is an isometric view of an instrumented ejection cam track.

FIG. 1 shows an ejection cam track at 1 with integral track sections 2 and 3 leaving a gap in which a movable segment 4 is situated. This segment has a case hardened surface and is a part of a tongue 5 which is fastened at its other end by bolts. As the drawing shows the track itself, the location of the bolts is shown by their holes. Strain gauges 7 are mounted on the tongue and the signal from them is carried to a suitable readout through the conventional wires (not shown).

It will be apparent that the movable segment 4 is at the end of a cantilever beam and so is quite sensitive to pressure of the lower punches as they move over the cam track. A phantomed line 8 on FIG. 1 shows the outline of a normal integral ejection cam track. It will be seen that the incorporation of the present invention does not change the portions of the ejection cam track which are fastened to the tabletting machine. This is shown at 9. In other words, the new cam tracks of the invention fits on to a standard rotary tabletting press, requiring only the provision for the two bolts going through the bolt holes 6. It is thus not necessary to redesign the rotary tabletting machine at all; all that is required is the drilling and tapping of two holes to receive bolts passing through the holes 6.

Figure 2:
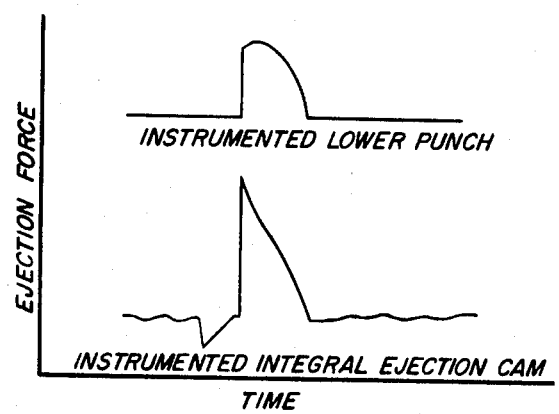
FIG. 2 is a graph of the signal from an instrumented lower punch compared to an instrumented ejection cam track which is in one solid piece.

FIG. 2 shows graphs of strain gauge responses, the upper graph being from a separately instrumented lower punch and the lower graph being from an integral ejection cam. The drastically different shape of the graphs is self-evident, and the matter is further complicated by the fact that the lower graph is not necessarily reproducible throughout a full rotation of the tabletting machine.

Figure 3:
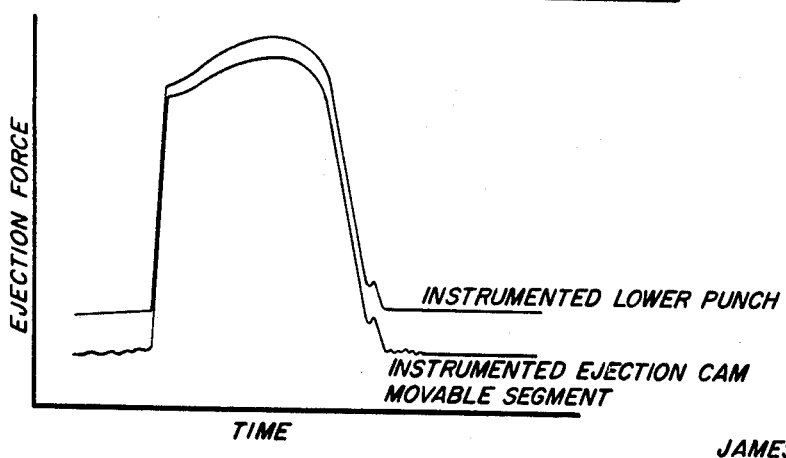
FIG. 3 is a similar pair of graphs in which the lower curve is from a separate segment according to the present invention.

FIG. 3 shows on a somewhat enlarged scale the instrumented lower punch graph and the graph obtained from a movable segment according to the present invention. In order to display the shapes of the graphs more accurately, the lower graph has been slightly lowered on the paper. It will be apparent that the graphs are practically superimposable and, for all practical purposes, are of identical shape.

The output from the strain gauges can be displayed continuously, for example on an oscilloscope, and it will be at once noticed if there is any marked departure from standard graph shape. It is possible to synchronize the signal readout so that the location of a defective or abnormal punch can be located. This can either be continuous, for example by suitable electronic means, or the graph shape can be monitored on an oscilloscope and whenever an anomalous graph appears synchronizing readout can be cut in, for example a short strip of recorder tape, in order to locate the exact punch which is showing abnormal results.

The present invention is not particularly concerned with the form in which the signal from the strain gauges is read out, and suitable standard electronic readouts may be used. Another way of thinking of the invention is that it ceases once the strain gauges have put out their signals. Also, strain gauges have been referred to as typical force measuring devices, but the invention is not limited thereto and other elements, such as load washers, may be used.

We claim:

1. In a rotary tabletting machine in which tablets are ejected by moving lower punches over an inclined cam track, the improvement which comprises:
   (a) an interrupted ejection cam track having at least one segment capable of movement with respect to the remainder of the track, and
   (b) means associated with said movable segment of said cam tract for producing a signal readout proportional to the force exerted on said movable segment, whereby the ejection force is accurately measured and continuously monitored for each individual punch.

2. A tabletting machine according to claim 1 in which the movable segment in the ejection cam track is at the end of a relatively stiff cantilever beam, and the signals are produced proportional to the bending of the beam.

3. A machine according to claim 2 in which the signals are electrical signals produced by strain gauges mounted on the beam intermediate between the movable track segment and the point of cantilever attachment.

4. A machine according to claim 3 in which the movable track segment has a case hardened face which, at rest, is accurately aligned with and forms a continuation of the ejection cam track.

References Cited

UNITED STATES PATENTS

| | | | |
|---|---|---|---|
| 901,937 | 10/1908 | Scott | 18—20 |
| 1,289,570 | 12/1918 | Stokes | 18—20 |
| 1,711,978 | 3/1929 | Wanders | 18—20 |
| 2,989,781 | 6/1961 | Frank | 18—20 |
| 2,997,741 | 8/1961 | Crossley | 18—20 |
| 3,332,367 | 7/1967 | Sperry et al. | 18—20 |
| 3,337,915 | 8/1967 | Alexander | 18—20 |

FOREIGN PATENTS

| | | |
|---|---|---|
| 350,924 | 3/1922 | Germany. |

J. HOWARD FLINT, JR., *Primary Examiner.*